(12) United States Patent
Gunreben et al.

(10) Patent No.: US 9,409,536 B2
(45) Date of Patent: *Aug. 9, 2016

(54) CONNECTOR ASSEMBLY WITH AUTOMATIC SECONDARY LOCK

(71) Applicant: DELPHI INTERNATIONAL OPERATIONS LUXEMBOURG S.A.R.L., Bascharage (LU)

(72) Inventors: Michael Gunreben, Schwanstetten (DE); Vincent Regnier, Nuremberg (DE)

(73) Assignee: Delphi International Operations Luxembourg SARL, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 14/435,818

(22) PCT Filed: Mar. 15, 2013

(86) PCT No.: PCT/EP2013/055480
§ 371 (c)(1),
(2) Date: Apr. 15, 2015

(87) PCT Pub. No.: WO2014/072081
PCT Pub. Date: May 15, 2014

(65) Prior Publication Data
US 2015/0232055 A1    Aug. 20, 2015

Related U.S. Application Data

(60) Provisional application No. 61/725,234, filed on Nov. 12, 2012.

(51) Int. Cl.
*B60R 21/01* (2006.01)
*B60R 21/16* (2006.01)
(Continued)

(52) U.S. Cl.
CPC ............ *B60R 21/16* (2013.01); *B60R 21/20* (2013.01); *H01R 13/627* (2013.01); *H01R 13/639* (2013.01); *H01R 13/70* (2013.01); *B60R 2021/01006* (2013.01); *H01R 2201/26* (2013.01)

(58) Field of Classification Search
CPC ............ H01R 13/627; H01R 13/6273; H01R 13/6277; H01R 13/639; H01R 13/641; H01R 13/70; H01R 13/7032; H01R 13/713; H01R 4/48; H01R 2201/26; B60R 16/02; B60R 2021/01006
See application file for complete search history.

(56) References Cited

U.S. PATENT DOCUMENTS 5,275,575 A * 1/1994 Cahaly ............... H01R 13/7032
                                              200/51.1
5,370,543 A * 12/1994 Hamada ............... H01R 13/641
                                              439/188

(Continued)

FOREIGN PATENT DOCUMENTS

DE    10005858 A1    8/2001
DE    10202920 A1    8/2003

(Continued)

OTHER PUBLICATIONS

International Search Report for Int'l Appl. No. PCT/EP2013/055480, published Jul. 11, 2013.

*Primary Examiner* — Laura Freedman
(74) *Attorney, Agent, or Firm* — Robert J. Myers (57) ABSTRACT

The present invention relates to a connector assembly in particular for airbag connection systems, including a connector housing and a secondary lock. The housing is further provided with a spring, such that the secondary lock is movable between a first and a second position and the spring forces the secondary lock into its second position when the connector housing is fully mated with a corresponding mating connector.

15 Claims, 6 Drawing Sheets

(51) Int. Cl.
  *H01R 13/627* (2006.01)
  *H01R 13/639* (2006.01)
  *H01R 13/70* (2006.01)
  *B60R 21/20* (2011.01)

(56) References Cited

U.S. PATENT DOCUMENTS

| | | | | |
|---|---|---|---|---|
| 5,562,486 A * | 10/1996 | Saijo | ............... | H01R 13/4362 439/188 |
| 5,618,201 A * | 4/1997 | Yagi | ............... | H01R 13/6275 439/188 |
| 5,895,282 A * | 4/1999 | Little | ............... | H01R 13/625 439/332 |
| 5,993,230 A * | 11/1999 | Gauker | ............... | H01R 13/7032 200/51.1 |
| 6,328,589 B1 * | 12/2001 | Annecke | ............... | H01R 13/501 439/352 |
| 6,341,972 B1 | 1/2002 | Odorfer | | |
| 6,530,799 B2 * | 3/2003 | Regnier | ............... | H01R 13/639 439/352 |
| 8,968,021 B1 * | 3/2015 | Kennedy | ............... | H01R 13/6273 439/352 |
| 9,039,438 B2 * | 5/2015 | Gunreben | ............... | H01R 13/6273 439/352 |
| 9,054,457 B2 * | 6/2015 | Odorfer | ............... | F24B 3/26 |
| 9,147,971 B2 * | 9/2015 | Osada | ............... | H01R 13/641 |
| 9,172,183 B2 * | 10/2015 | Siwek | ............... | H01R 13/6273 |
| 9,172,187 B2 * | 10/2015 | Miyakawa | ............... | H01R 13/629 |
| 9,190,742 B2 * | 11/2015 | Gunreben | ............... | H01R 13/6277 |
| 9,209,561 B2 * | 12/2015 | Miyakawa | ............... | H01R 13/6273 |
| 2013/0252455 A1 | 9/2013 | Gunreben et al. | | |
| 2015/0037996 A1 * | 2/2015 | Chen | ............... | H01R 13/6273 439/345 |
| 2015/0219708 A1 * | 8/2015 | Odorfer | ............... | H01R 13/641 324/538 |
| 2016/0013583 A1 * | 1/2016 | Regnier | ............... | H01R 13/639 439/345 |

FOREIGN PATENT DOCUMENTS

| | | |
|---|---|---|
| EP | 1124291 A2 | 8/2001 |
| WO | 9741623 A1 | 11/1997 |
| WO | 2012055719 A1 | 5/2012 |

* cited by examiner

CONNECTOR ASSEMBLY WITH AUTOMATIC SECONDARY LOCK

CROSS-REFERENCE TO RELATED APPLICATION

This application is a national stage application under 35 U.S.C. §371 of PCT Application Number PCT/EP2013/055480 having an international filing date of 15 Mar. 2013, which designated the United States, said PCT application claiming the benefit of priority under Article 8 of the Patent Cooperation Treaty to U.S. Patent Application No. 61/725,234, having filing date of Nov. 12, 2012, the entire disclosure of each of which are hereby incorporated herein by reference.

TECHNICAL FIELD OF THE INVENTION

The present invention relates to a connector assembly comprising a secondary locking member and a spring which biases, i.e. automatically disposes, the secondary locking member into a locked position when the connector assembly is fully mated with a corresponding mating connector.

BACKGROUND OF THE INVENTION

In many applications, the safe coupling of connectors is of high importance. For example, in the case of car safety systems, as e.g. airbag systems in passenger cars, the connectors used for the connection of an airbag to its ignition base have to be provided with reliable safety systems. To ensure that the connectors cannot become loose unintentionally, secondary locking members are used to guarantee the safe mechanical coupling.

An example of a connector with a secondary locking member is described in the WO 97/41623 A1. This document describes a connector 20 which can be mated with a corresponding counter-connector being part of an airbag ignition mechanism. In assembled condition, when the connector is mated with the corresponding counter-connector, it is fixed to the counter-connector by means of flexible latching arms. During mating of the connectors, these arms are deflected and snap back into corresponding latching clearances of the counter-connector, when fully mated. For securing the mechanical coupling of the connectors, the WO'623 suggests a secondary locking member which can be inserted into the connector when the two connectors are mated. The secondary locking member comprises locking arms, which upon insertion of the secondary locking member move between faces of the counter-connector housing and the latching arms of the connector. Once the locking arms are inserted, they inhibit bending of the latching arms. Thus, the latching arms cannot bend out of the latching clearances and the mechanical coupling of the connectors is secured. The secondary locking member described in WO'623 is further provided with locking means to fix the secondary locking member in its locking position, which is the above described position in which it secures the connector mating. However, in the case described in the WO'623, it is possible to place the secondary locking member in a half-fitting position, in which it may not function properly and in which it is not fixed to the connector, and therefore can be removed unintentionally.

A further development of a secondary locking member is disclosed in the co-owned patent application DE 100 05 858 A1. This document discloses a connector with a secondary locking device and a safety spring element, which serves to hold the secondary locking member in a pre-locked position, in which the secondary locking member is mounted to the connector housing but does not hinder mating or unmating of the connector with a corresponding counter-connector. The safety spring element described in the DE'858 further provides a so-called go/no go function for the secondary locking member: In the pre-locked position of the secondary locking member, two spring arms of the safety spring element are in contact with stop shoulders of the secondary locking member, thereby preventing a movement of the secondary locking member in direction towards its locking position. Upon mounting of the connector to a corresponding counter-connector, the counter-connector housing comes into contact with a releasing portion of the connector housing, thereby pressing this releasing portion against the safety spring element. By this pressing action, the safety spring element is deformed and the two spring arms are freed from the stop shoulders of the secondary locking member. Upon consequent moving of the secondary locking member towards its locking position, each spring arm is guided by an inclined channel of the secondary locking member, thereby being bent and biased against the edge of this inclined channel. Shortly before the secondary locking member is placed in its locking position, each spring arm passes a turning point of the inclined channel and snaps into a notch of the secondary locking member, thereby fixing the secondary locking member in its locking position. As long as the secondary locking member is not placed in this locking position, the spring arms are biased against the edges of the inclined channel, and due to the resulting restoring spring force they inhibit the secondary locking member to be placed in a half-fitting position unintentionally: i.e. the spring force causes the secondary locking member to move back into its pre-locked position. The safety spring element thereby provides a go/no go mechanism for the secondary locking member, which assures that the secondary locking member is either placed correctly in its locking position or is moved back into its pre-locked position, but prevents any intermediate position.

A similar mechanism is described in the co-owned WO 2012/055719 A1.

BRIEF SUMMARY OF THE INVENTION

According to one aspect of the invention, a connector assembly is provided comprising a connector housing, a secondary locking member and a spring, whereby the secondary locking member and the spring are assigned to the connector housing. The secondary locking member is movable between a first and a second position and when placed in its second position, it serves to secure the mating of the connector housing in the case that the connector housing is mated to a corresponding counter-connector. The second position is thus the locking position of the secondary locking member. During mating, the spring is biased to cause the secondary lock to move automatically into a locked position when the connector assembly is fully mated with is corresponding counter-connector without need for an operator to push the secondary locking member into the locked position. The spring is biased to cause the connector housing and its corresponding counter-connector to spring back to an open position if the two connectors are not fully mated. In an exemplary embodiment, there is no tension or stress on components when the connectors are in the mated or unmated conditions. With the feature that the spring is adapted "to bias" the secondary locking member into its second position it is herein meant, that the spring is arranged such that upon mating of connector housing with a corresponding counter-connector the spring will automatically move or dispose the secondary lock into its second position.

In a second aspect of the invention, the connector assembly provides for circuit monitoring in the connector.

In another exemplary embodiment, the connector housing comprises at least one latching arm adapted to latch with a corresponding counter-connector. The connector housing may comprise a plugging portion and has two latching arms being symmetrically arranged on opposite sides of the plugging portion. Thus, upon mating respectively inserting of the plugging portion into the corresponding counter-connector, the two latching arms are firstly bent towards each other and then snap back into a corresponding latching groove or recess provided in the counter-connector. The secondary lock may comprise at least one blocking surface, which is adapted to block a release movement of the latching arm(s) when the secondary lock is in the second position. The blocking surface can for example be arranged on a dedicated element such as a locking leg or arm of the secondary lock or can be provided for example as part of other functional members of the secondary locking arm, as will be described in more detail below. This blocking surface may be arranged such that it blocks the latching arms of the connecter housing in their respective positions, when the secondary lock is in the second position.

In yet another exemplary embodiment, the spring in accordance with the present invention comprises at least one actuating arm which is operationally connected to the secondary lock, for biasing the secondary lock in the second position. This can for example be achieved, by a direct contact of the actuating arm and the secondary lock, however, it could also be achieved indirectly by further elements which are being provided between the actuating arm and the secondary lock. It is however important, that the actuating arm actively pushes or moves the secondary lock from the first position into the second position upon full mating of connector housing and corresponding counter-connector.

In an alternative embodiment, the secondary lock further comprises at least one latching arm adapted to latch to a corresponding counter-connector when mated and when the secondary lock is in its second position. Thereby, the secondary lock can be secured in the second position. The latching arm or arms of the secondary lock may be provided with actuating release handles to allow a manual unlatching of the arms. Thus, when the connector assembly is fully mated, an operator can release the latching arms of the secondary lock by actuating the release handles and subsequently moving the secondary lock from the (closed or locked) second position to the first position.

In another alternative embodiment, the connector assembly is further provided with a contact element, which allows the monitoring of the mating process, respectively the monitoring of a correct mating between connector housing and corresponding counter-connector. The contact element is an electrical contact element and adapted to be actuated upon mating by coming into contact with a portion of the corresponding counter-connector. Thereby, the contact element is disposed, to close or open an electrical circuit. The opening or closing of the electrical circuit allows a remote monitoring of the mating process. The contact element may be provided such on the connector housing, that it is only disposed (thereby opening or closing the electrical circuit),upon fully and correct mating of counter-connector and connector housing.

Generally, the connector assembly of the present invention may also further comprise a corresponding counter-connector. The corresponding counter-connector may be an airbag squib socket and the connector housing is accordingly an airbag squib connector housing.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

In one aspect, the present invention improves the state of the art by providing a connector assembly with an improved secondary locking mechanism. In another aspect, the present invention further improves the state of the art by providing a novel approach for performing electrical monitoring for determining whether an electrical connector is mated with a corresponding mating connector.

Figure 1:
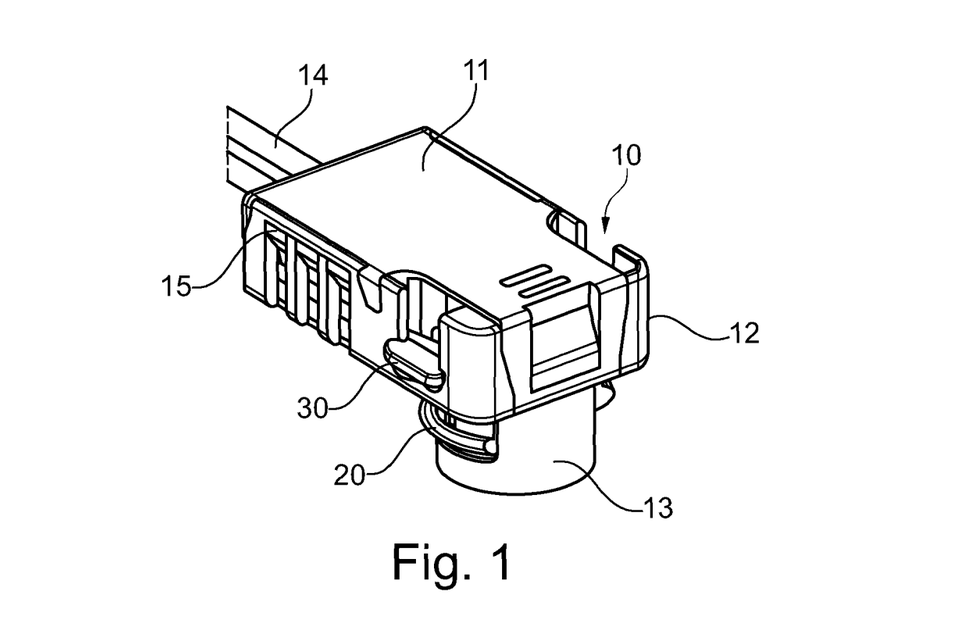
FIGS. 1-5 show schematic illustrations of a connector housing comprising a secondary lock in accordance with the present invention from different views.

FIG. 1 shows a perspective, three-dimensional view of a connector housing 10 in accordance with the invention. The connector housing 10 comprises a main body 12 and a cover 11 which is removably latched to the main body 12 by means of latch connections 15. At the bottom side of the main body 12 a cylindrical plugging portion 13 is provided. The skilled person will recognize, that the plugging portion 13 is adapted to co-operate with typical airbag squib sockets and that the device shown is thus an airbag squib connector. On opposite sides of the plugging portion 13, two latching arms 20 are arranged. In other words, the two latching arms 20 are arranged symmetrically on opposite sides of the plugging portion 13. Indicated by the reference number 30, a secondary lock 30 is arranged moveable inside of the main body 12 of the connector housing 10. Secondary lock 30 is shown it its second position, i.e. in the closed or locked position. When coupled or mated to a corresponding counter-connector, the secondary lock 30 will prevent an unintentional unmating of the two connector parts in the position shown in FIG. 1.

Figure 2:
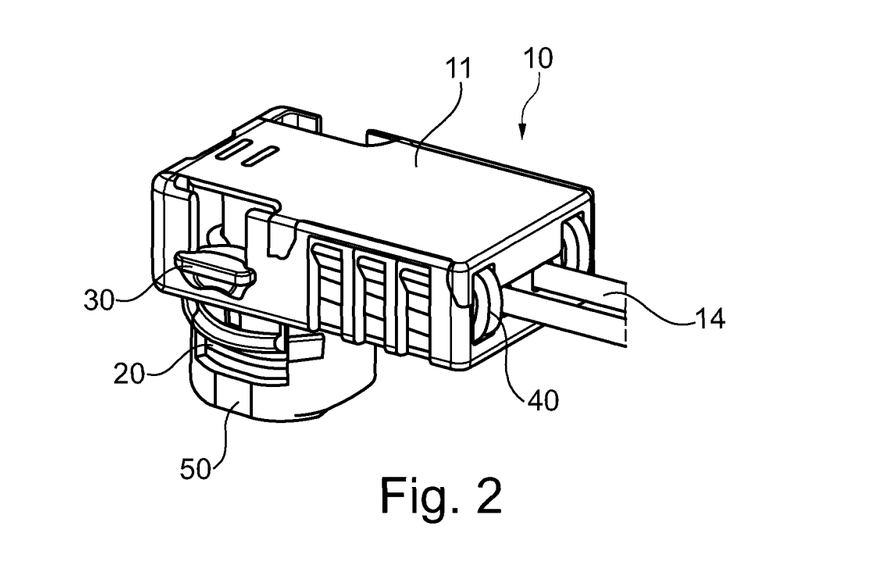

FIG. 2 shows the same device from a different angle. Further, in FIG. 2 a retainer 50 is shown for illustrative purposes. The skilled person will recognize, that the retainer 50 is part of an airbag squib socket and thus forms part of the corresponding counter-connector. Also visible in the view of FIG. 2 is the spring 40, which biases the secondary locking member into the second position shown in FIGS. 1 and 2. The spring 40 is arranged at the connector housing 10 that upon mating, the spring 40 will automatically move the secondary lock 30 in the second position shown in for example FIG. 2.

FIG. 3 shows again the same arrangement as FIG. 2 from a different perspective, however with the cover 11 removed to allow a view of the interior construction of the connector housing 10. From FIG. 3 one can see that electrical cables 14 are mounted inside of the connector housing 10. The electrical cables 14 are partially covered by a ferrite element 16, as it is well known to the skilled person. In the open view of FIG. 3 one can see the construction of the spring 40 in the illustrated embodiment. The spring 40 is made from a single wire of spring steel. To this end, the spring 40 comprises in the embodiment shown two spring arms 41 that are operationally connected with the secondary lock 30. The spring arms 41 can therefore be denoted as actuating arms 41, as will be described in more detail below. As one can recognize in FIG. 3, the two free ends of the spring arms 41 or actuating arms 41 are operationally connected to the secondary lock 30, whereas the opposite ends of the actuating arms 41 merge into two respective spring coils 42, which again merge into a u-shaped frame 43, which connects the two actuating arms 41 together. It is clear for the skilled person, that the shown spring 40 is only one example and that it is possible to use also other constructions without deviating from the core idea of the present invention. Turning back to FIG. 3, the skilled person recognizes that the arrangement of the spring 40 in the connector housing 10 is in a preloaded configuration of the spring 40. Only upon movement of the secondary lock 30 upwards in FIG. 3, i.e. away from retainer 50, the spring 40, via the actuating arms 41 will be tensioned, thereby applying a force, or bias, against the movement of the secondary lock 30. Thereby, the spring 40 will automatically move the secondary lock 30 in the second position, if the secondary lock 30 is released.

Figure 3:
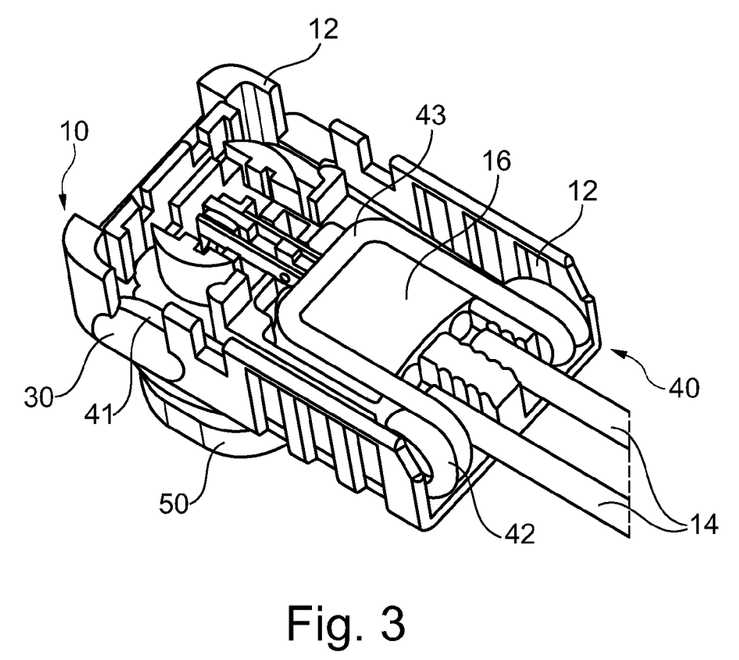

As one can take from FIG. 3, the spring coils 42 are arranged, such that the winding axis of each coil is in a plane perpendicular to the mating direction of the connector housing 10.

Figure 4:
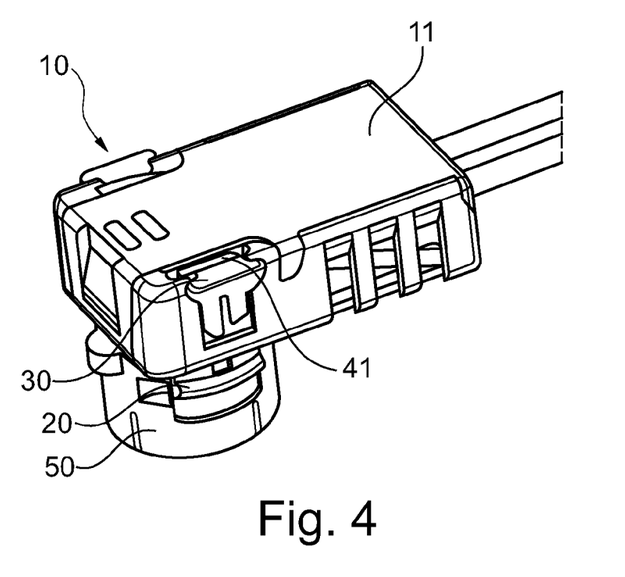
Figure 5:
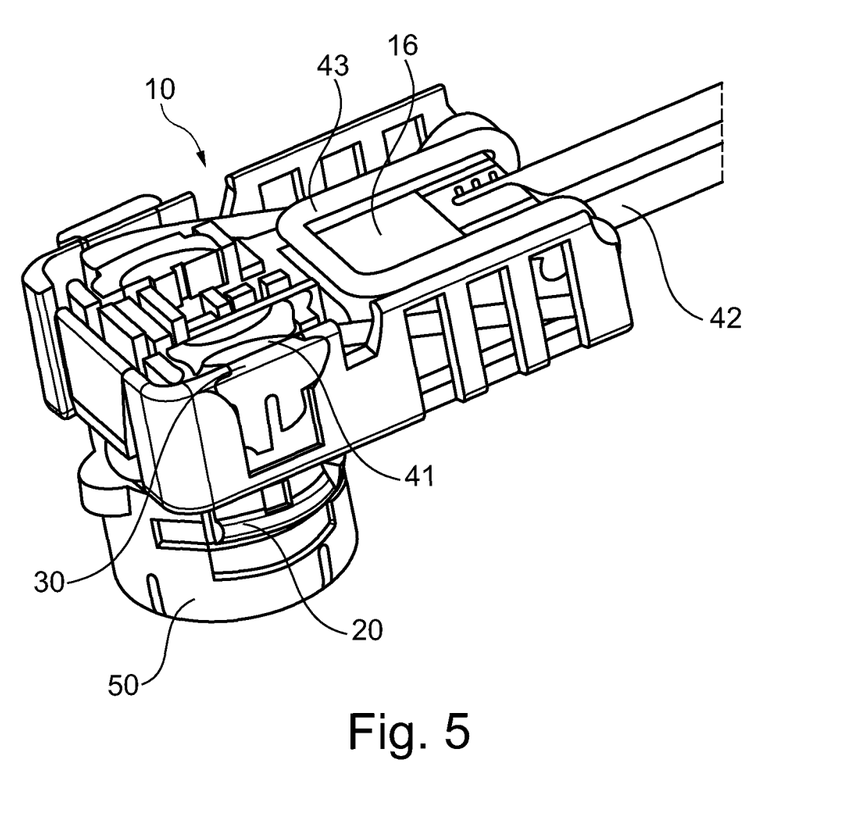

FIGS. 4 and 5 show the situation upon mating of connector housing 10 with the corresponding counter-connector, here indicated by the retainer 50. FIG. 5 shows the same view as FIG. 4, however with the cover 11 of the connector housing 10 removed. One can see from both figures, that the secondary lock 30 is moved "upwards" in the figures, i.e. against the mating direction away from retainer 50. How this is achieved will be explained in more detail in the following with regard to FIGS. 6 and 7. Turning back to FIG. 5, one can see how the two actuating arms 41 of spring 40 are moved together with the secondary lock 30 against the mating direction, thereby putting the spring 40 under tension. The position of secondary lock 30 shown in FIGS. 4 and 5 is the so called first position, since now it is possible to fully mate the connector housing 10 with the corresponding counter-connector, since the secondary lock 30 no longer blocks the latching arms 20. To be precise, the position shown in FIGS. 4 and 5 is the almost mated condition at the end of the mating process, shortly before the secondary lock 30 will be released and automatically moved into the second position by means of the spring 40. This can best be understood by considering FIGS. 6 and 7.

Figure 6:
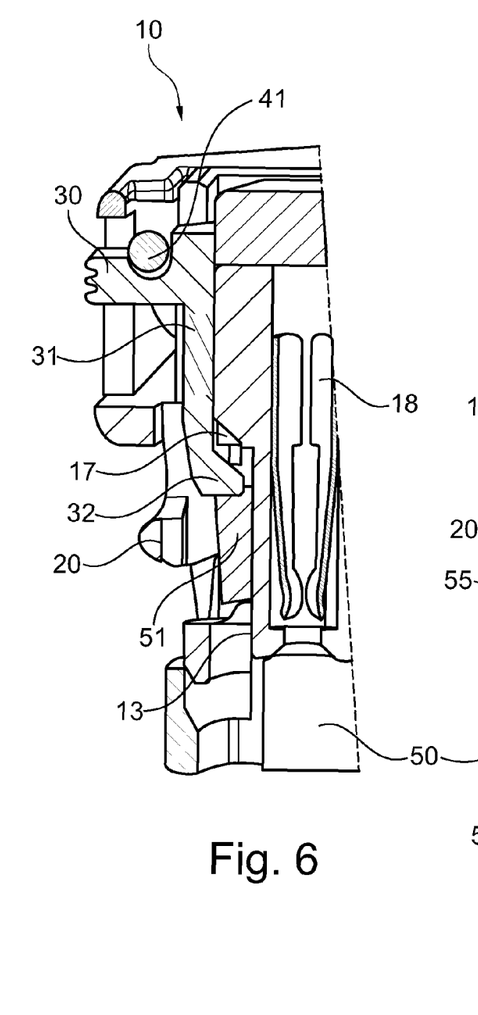
FIG. 6 is a partially cut view illustrating the interior of the connector housing upon mating.
Figure 7:
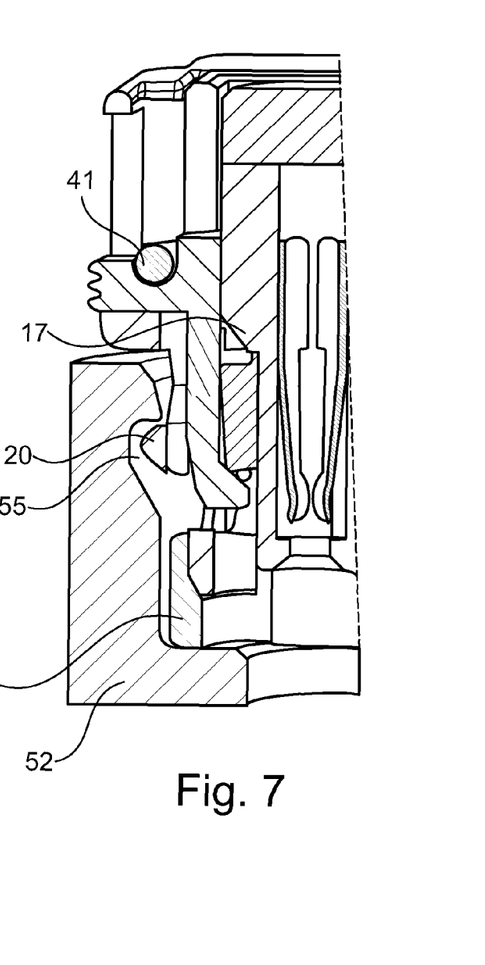
FIG. 7 show the same partial cut as FIG. 6, however, with the secondary lock in its closed, i.e. second position.

FIG. 6 shows a partially cut view of the connector during the mating process. From the cut view, one can see how the plugging portion 13 is partially inserted into the retainer 50. In the position shown, a stop member 51 of retainer 50 comes into blocking contact with an actuating surface 32 provided at the free end of an actuating arm 31 of the secondary lock 30. Thereby, upon movement of the connector housing 10 in mating direction into the retainer 50, the whole secondary lock 30 is moved upwards in the figure against the mating direction since actuating surface 32 rests on stop member 51. In the position shown in FIG. 6, the actuating arms 41 of the spring 40 are under high tension and basically in the same position as shown in FIGS. 4 and 5. However, since the secondary lock 30 rests firmly on the stop member 51 via the actuating surface 32 and actuating arm 31, the spring 40 cannot move the secondary lock 30 back into the second position shown in FIGS. 1 to 3. However, the connector housing 10 comprises an inclined release surface 17. This inclined release surface 17 comes into contact with the free end of actuating arm 31 at the end of the mating process. When this happens, the inclined release surface 17 will push the actuating arm 31 of the secondary lock 30 outwardly, i.e. away from the plugging portion 13. The skilled person will recognize that thereby the actuating surface 32 will be lifted from the stop member 51. When this happens the secondary lock 30 is released and the tensioned spring 40 will automatically move the secondary lock 30 in the second position as shown in FIGS. 1 and 2. This arrangement is also shown in FIG. 7. The skilled person will understand that the secondary lock 30 is only released after the latching arms 20 of the connector housing 10 can snap into the latching groove 55 of the corresponding counter-connector (cf. to FIG. 7). Thereby, it is secured that the secondary lock 30 will only be moved automatically into the second position shown in FIG. 7, when the mating of connector housing 10 and counter-connector is complete. One can further see from FIG. 7, how the actuating arm 31 of secondary lock 30 is now arranged between the latching arm 20 and a portion of the retainer 50, respectively between the plugging portion 13. In the position shown in FIG. 7, it is not possible to move the latching arm 20 inwardly, i.e. towards the plugging portion 13 so that it is impossible to bend the latching arm 20 out of the locking engagement with latching groove 55. An unmating of the two connectors is only possible, after an operator manually releases the secondary lock 30, by pulling it against the mating direction and the biasing force of spring 40.

Reference number 18 denotes electrical female terminals provided in the plugging portion 13.

Figure 8:
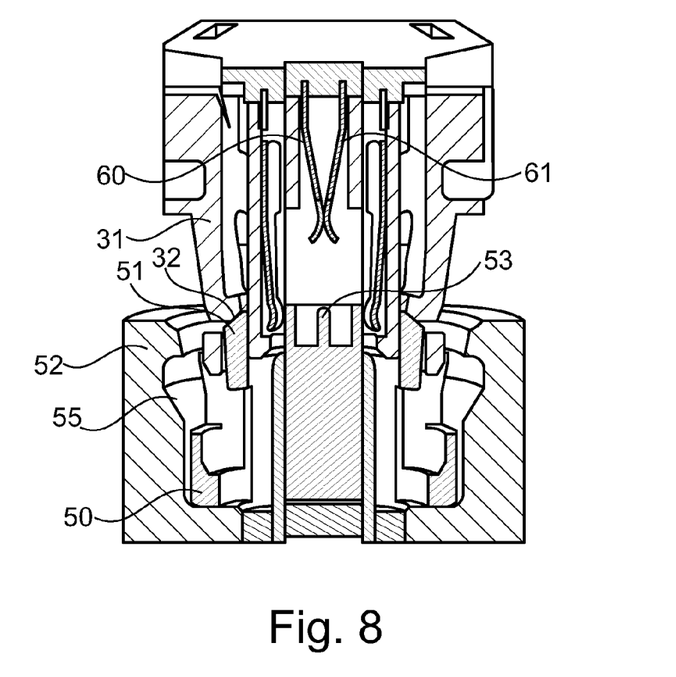
FIG. 8 shows a cut view of connector housing and corresponding counter-connector before mating.
Figure 9:
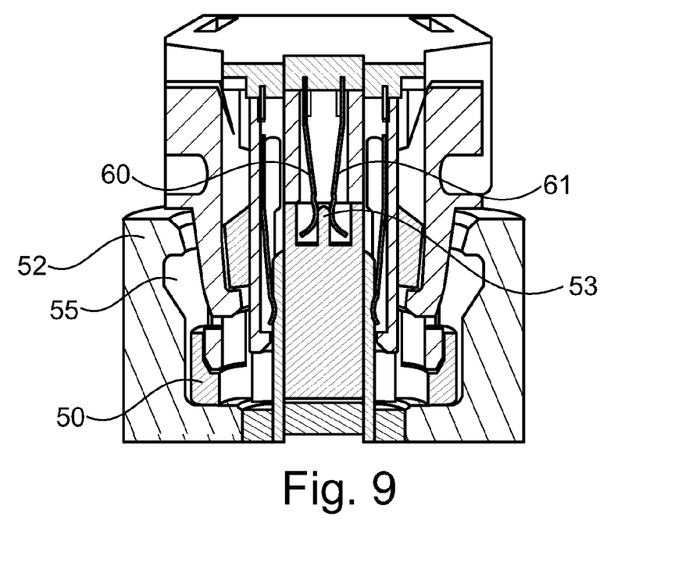
FIG. 9 shows the same view as FIG. 8, however, in the mated condition of connector housing and counter-connector.

Referring to FIGS. 8 and 9, the present invention also proposes a particular monitoring function to monitor whether the connector assembly is fully mated or not. This is achieved in the shown embodiment by means of two contact elements 60 and 61, which are arranged in the connector housing 10. The contact elements 60, 61 are connected to respective signal wiring, which is however not shown in the figures. In the position shown in FIG. 8, the contact elements 60 and 61 are in electrical contact with each other, so that an electrical circuit is closed. This can be monitored by suitable control equipment, which is in general known to the skilled person. Upon mating with a corresponding counter-connector, which is in FIG. 8 indicated by squib socket housing 52 and retainer 50, the contact elements 60, 61 come into contact with a corresponding portion 53 provided at a suitable location on the counter-connector. In the fully mated condition shown in FIG. 9, the portion 53 bends the contact elements 60, 61 out of contact with each other, thereby opening the electrical circuit. This can be monitored by suitable control equipment. It is clear for the skilled person, that a similar arrangement could also be used, wherein the contact elements 60, 61 are initially not in contact with each other, i.e. with an initially open electrical circuit, and are only moved into contact with each other by the portion 53, thereby closing the electrical circuit. Also this can be easily monitored by suitable control equipment, thereby allowing a monitoring of the mating of connector housing 10 with corresponding counter-connector.

Figure 10:
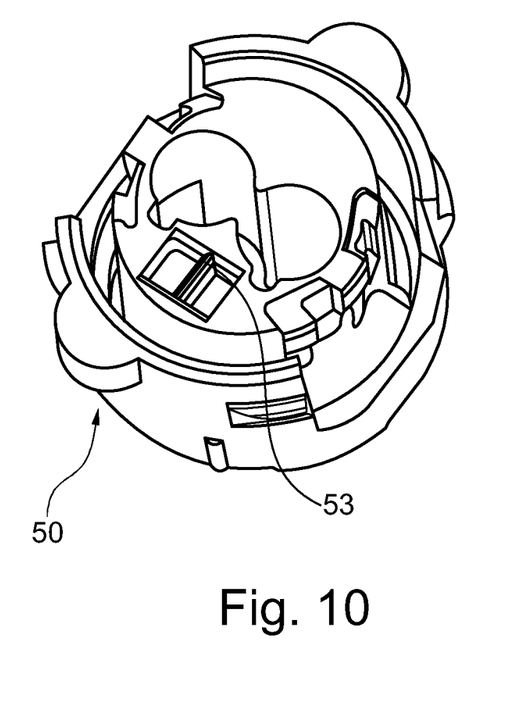
FIG. 10 shows a schematic illustration of a part of the counter-connector.

In FIG. 10, the retainer 50 is shown again in more detail. From this FIG. 10, one can see portion 53 whereby a low cost circuit monitoring is achievable.

LIST OF REFERENCE NUMERALS

10. Connector Housing
11. Cover

12. Main body of connector housing
13. Plugging portion
14 Electrical cables
15. Latch connection
16. Ferrite element
17 Inclined release surface
18. Electrical female contacts
20. Latching arms
30. Secondary lock
31. Actuating arm of secondary lock
32. Actuating surface
40. Spring
41. Spring arms
42. Spring coil
43. U-shaped frame
50. Retainer (part of counter-connector)
51. Stop member
52. Squib socket housing
53. Portion
55. Latching groove
60, 61. Contact elements

We claim:

1. A connector assembly, comprising:
a connector housing;
a secondary lock; and
a spring, wherein the secondary lock is movable between a first and a second position and the spring is adapted to bias the secondary lock into the second position when the connector housing is fully mated with a corresponding counter-connector and wherein the spring is arranged at the connector housing such that upon mating the spring automatically moves the secondary lock in the second position.

2. The connector assembly according to claim 1, wherein the connector housing comprises at least one latching arm adapted to latch with the corresponding counter-connector.

3. The connector assembly according to claim 2, wherein the secondary lock comprises at least one blocking surface, which is adapted to block a release movement of the at least one latching arm when the secondary lock is in the second position.

4. The connector assembly according to claim 1, wherein the connector housing comprises a plug-in portion and two latching arms symmetrically arranged on opposite sides of the plug-in portion.

5. The connector assembly according to claim 1, wherein the spring comprises at least one actuating arm being operationally connected to the secondary lock, for biasing the secondary lock in the second position.

6. The connector assembly according to claim 1, wherein the spring comprises at least one coil, whereby a winding axis of said coil is in a plane perpendicular to a mating direction of the connector housing.

7. The connector assembly according to claim 1, wherein the secondary lock comprises an actuating surface adapted to be engaged by a portion of the corresponding counter-connector to move the secondary lock against a mating direction of the connector housing upon mating of the connector housing with the corresponding counter-connector.

8. The connector assembly according to claim 1, wherein the connector housing comprises an inclined deflection surface adapted to deflect a portion of the secondary lock, when the secondary lock is moved towards the first position.

9. The connector assembly according to claim 1, wherein the secondary lock comprises at least one latching arm adapted to latch to the corresponding counter-connector when mated and when the secondary lock is in the second position.

10. The connector assembly according to claim 9, wherein the at least one latching arm of the secondary lock is provided with actuating release handles to allow a manual unlatching of the at least one latching arm.

11. The connector assembly according to claim 1, wherein the connector housing comprises at least one contact element adapted to be actuated upon mating with the corresponding counter-connector to close or open an electrical circuit to allow monitoring of a mating process.

12. The connector assembly according to claim 1, wherein the spring comprises at least one actuating arm being arranged in a direction perpendicular to a mating direction of the connector housing and wherein the at least one actuating arm is fixed on one end to the connector housing and is operationally connected at its other end with the secondary lock, for biasing the secondary lock in the second position.

13. The connector assembly according to claim 1, wherein the spring is arranged such that when the secondary lock is in the first position, the spring is tensioned and in the second position of the secondary lock the spring is pre-loaded.

14. The connector assembly according to claim 1, further the corresponding counter-connector.

15. The connector assembly according to claim 14, wherein the corresponding counter-connector is an airbag squib socket and the connector housing is an airbag squib connector housing.

* * * * *